(12) United States Patent
Hinton et al.

(10) Patent No.: US 6,249,366 B1
(45) Date of Patent: Jun. 19, 2001

(54) OUTBOARD SUPPORT FOR CANTILEVERED AIR BEARING STATIONARY SHAFT

(75) Inventors: John H. Hinton, Plano, TX (US); Cedric R. Burns; Joseph R. Pecoraro, both of Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/455,391

(22) Filed: Dec. 6, 1999

(51) Int. Cl.[7] .................................................. G02B 26/08
(52) U.S. Cl. .................. 359/200; 359/198; 359/216; 384/100; 310/90
(58) Field of Search ..................... 359/198, 200, 359/216–219, 871, 872; 310/90; 384/100, 115, 118

(56) References Cited

U.S. PATENT DOCUMENTS 4,523,800 * 6/1985 Yamashita et al. ................... 359/200

OTHER PUBLICATIONS

Gerald F. Marshall–Edited by; Copyright 1985 by Marcel Dekker, Inc.; Laser Beam Scanning Opto–Mechanical Devices, Systems, and Data Storage Optics; pp. 125–147, 149, 154; printed in the United States of America (No Month).

U.S. application Serial No. 09/216,586; filed Dec. 18, 1998; "Circular Polygon," by Charles C. Pecoraro et al.

* cited by examiner

Primary Examiner—James Phan
(74) Attorney, Agent, or Firm—John M. Kelly; David E. Henn

(57) ABSTRACT

Motor polygon assemblies having a housing, a cantilevered stationary shaft within the housing, a rotating sleeve, a multifaceted polygon mounted on the rotating sleeve, and a cover over the housing. The cover includes a protrusion that contacts the free end of the cantilevered stationary shaft. The protrusion stabilizes the free end.

6 Claims, 2 Drawing Sheets

FIG. 2
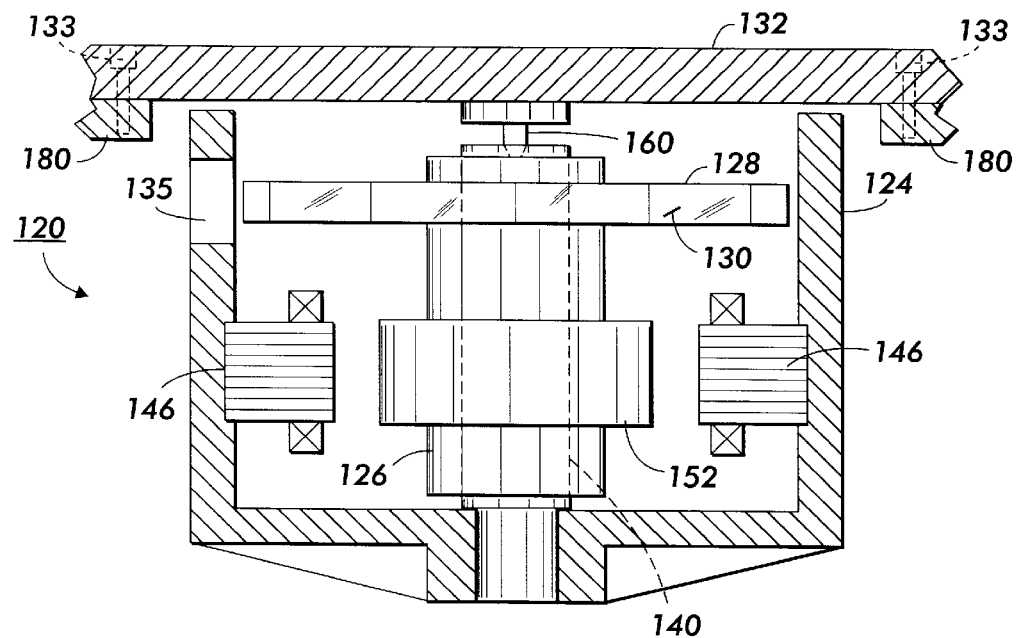
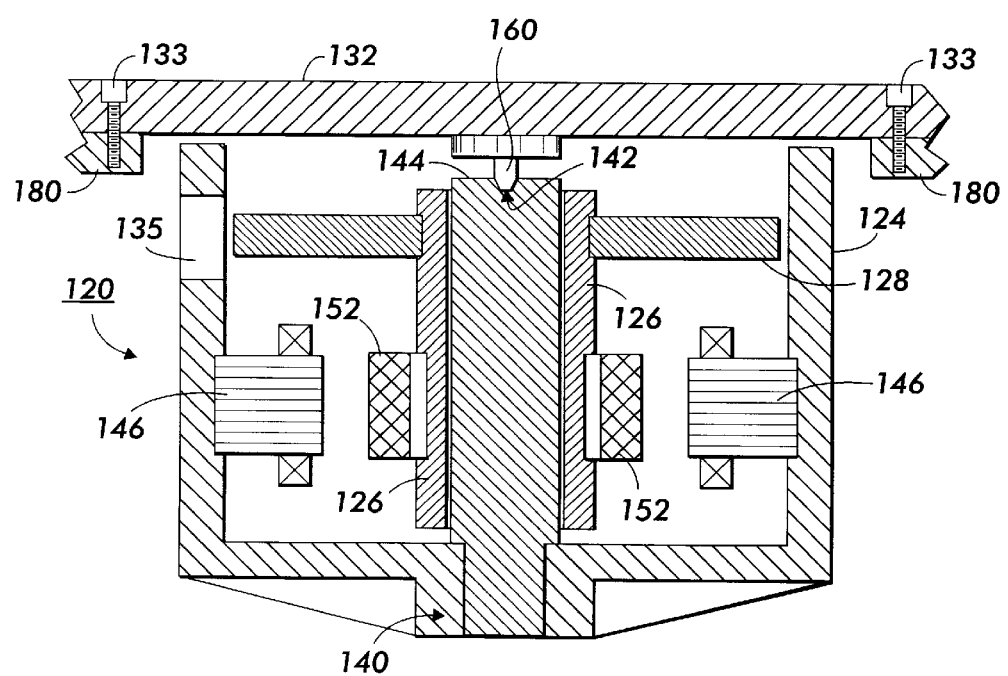
FIG. 3

OUTBOARD SUPPORT FOR CANTILEVERED AIR BEARING STATIONARY SHAFT

FIELD OF THE INVENTION

This invention relates to raster output scanners. More particularly it relates to reducing wobble and jitter from raster output scanners having motor polygon assemblies with stationary shafts.

BACKGROUND OF THE INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images.

One way of exposing the photoreceptor is to use a Raster Output Scanner (ROS). A ROS is typically comprised of a laser source (or sources), a pre-polygon optical system, a rotating polygon having a plurality of mirrored facets, and a post-polygon optical system. In a simplified description of operation light from the laser source is collimated and focused onto the rotating polygon by the pre-polygon optics; the light beam is reflected by the polygon's mirrored facets, and the reflected light is then directed by the post-polygon optical system into a finely focused light spot on the photoreceptor's surface. As the polygon rotates, the spot traces a path on the photoreceptor surface referred to as a scan line. By moving the photoreceptor as the polygon rotates the spot raster scans the surface of the photoreceptor. By modulating the laser beam with image information a predetermined latent image is produced on the photoreceptor.

Polygons typically are rotated at thousands, possible tens of thousands, of revolutions per minute. To achieve such rotational velocities polygons are usually mounted on air bearings. While several types of air bearing are known in the art, one type uses a housing with a centered, cantilevered stationary shaft and a rotating sleeve on the shaft. A multifaceted polygon is mounted on the rotating sleeve and the rotating sleeve forms part of a motor. Such a group of components is referred to as a motor polygon assembly (MPA). To create the air bearing, grooves (or flats) for generating air pressure are formed either around the outer surface of the stationary shaft or around the inner surface of the rotating sleeve. As the rotating sleeve turns air pressure is created between the shaft and the sleeve. That air pressure provides a low friction bearing that centers the rotating sleeve on the stationary shaft.

While motor polygon assemblies are beneficial, they are subject to various rotational defects. For example, wobble and jitter introduce scan line anomalies. While the post-polygon optical system is designed to reduce wobble and jitter, they are not totally effective. Additionally, the ROS optical components and their mounts have mechanical resonant frequencies that can be driven by a rotating motor polygon assembly. A prior art method of reducing rotational defects is to stiffen the housing and the cantilevered stationary shaft. While useful, this approach becomes increasingly more costly and bulky as stiffness is increased. Therefore, a new approach to reducing rotational defects in motor polygon assemblies having cantilevered stationary shafts would be beneficial.

SUMMARY OF THE INVENTION

The principles of the present invention provide for reduced rotational defects in motor polygon assemblies having cantilevered stationary shafts. Those principles further provide for raster output scanners that produce scan lines with reduced anomalies. A motor polygon assembly according to the principles of the present invention includes a housing, a cantilevered stationary shaft within the housing, a rotating sleeve, a multifaceted polygon mounted on the rotating sleeve, and a cover over the housing. The cover includes a protrusion that contacts the free end of the cantilevered stationary shaft so as to stabilize the cantilevered stationary shaft.

BRIEF DESCRIPTION OF THE DRAWINGS

Other aspects of the present invention will become apparent as the following description proceeds and upon reference to:

FIG. 2 illustrates a partial cross sectional view of a motor polygon assembly used in the printing machine of FIG. 1; and FIG. 3 illustrates a cross sectional view of the motor polygon assembly of FIG. 2.

DETAILED DESCRIPTION OF AN EMBODIMENT OF THE INVENTION

Figure 1:
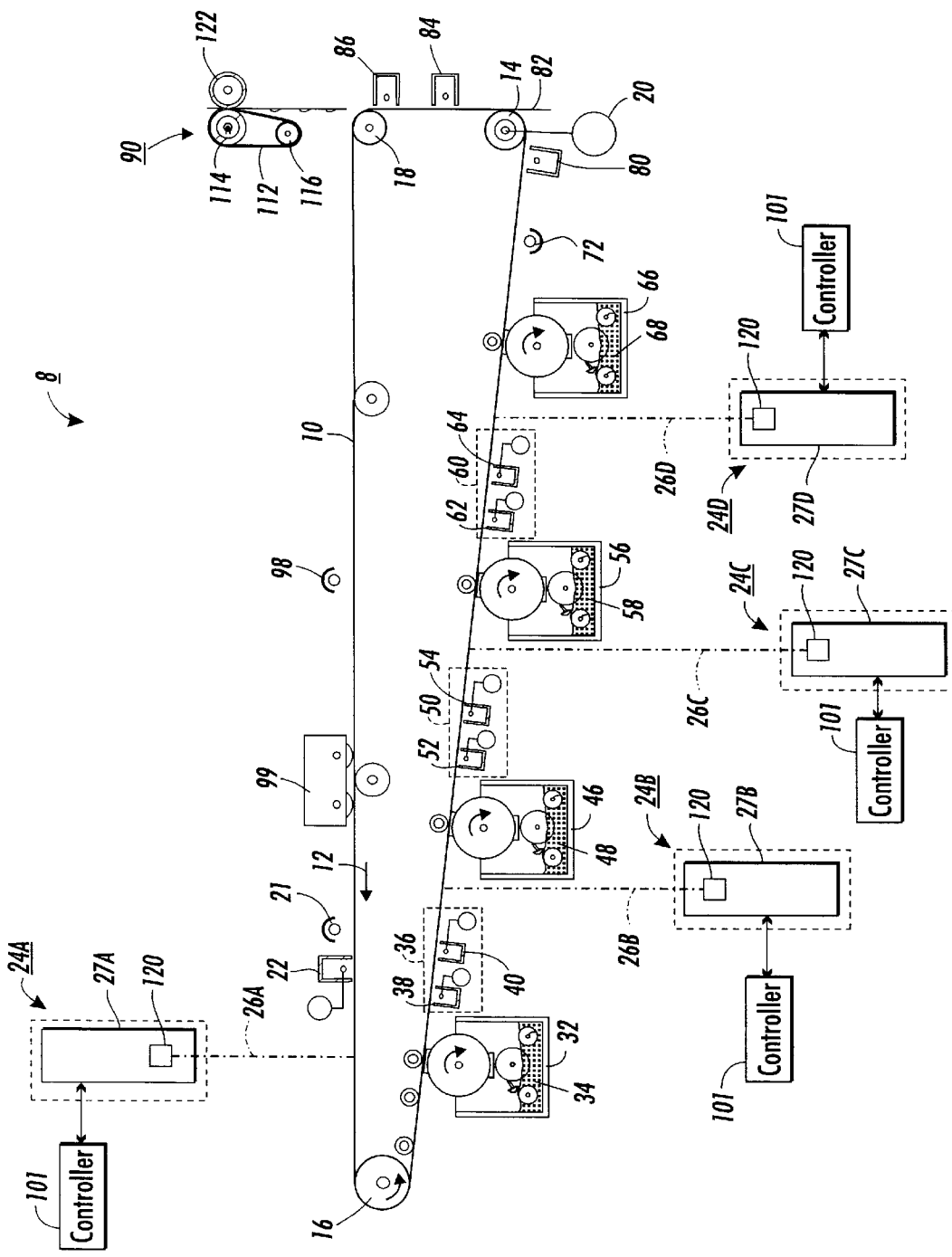
FIG. 1 schematically illustrates an electrophotographic printing machine that incorporates the principles of the present invention.

FIG. 1 illustrates an electrophotographic printing machine 8 that reproduces an original document. Although the principles of the present invention are well suited for use in such reproduction machines, they are also well suited for use in other devices. Therefore it should be understood that the present invention is not limited to the particular embodiment illustrated in FIG. 1 or to the particular application shown therein.

The illustrated electrophotographic printer 8 is a color electrophotographic, multipass, Recharge-Expose-and-Develop (REaD), Image-on-Image (IOI) printer. That machine includes an Active Matrix (AMAT) photoreceptor belt 10 that travels in the direction 12. Belt travel is brought about by mounting the photoreceptor belt about a driven roller 14 and about tension rollers 16 and 18, and then driving the driven roller 14 with a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22. The DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced. The raster output scanner includes a laser source, pre-polygon and post-polygon optics, and a new motor polygon assembly 120, reference FIGS. 2 and 3, that is described in more detail below.

After passing the exposure station 24A the exposed image area with the black latent image passes a black development station 32 that advances black toner 34 onto the image area so as to develop a black toner image. Biasing is such as to effect discharged area development (DAD) of the lower (less negative) of the two voltage levels on the image area. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to a recharging station 36 comprised of a DC corotron 38 and an AC scorotron 40. The recharging station 36 recharges the image area and its black toner layer using a technique known as split recharging. Briefly, the DC corotron 38 overcharges the image area to a voltage level greater than that desired when the image area is recharged, while the AC scorotron 40 reduces that voltage level to that which is desired. Split recharging serves to substantially eliminate voltage differences between toned areas and untoned areas and to reduce the level of residual charge remaining on the previously toned areas.

The recharged image area with its black toner layer then advances to an exposure station 24B. There, a laser beam 26B from a raster output scanner 27B exposes the image area to produce an electrostatic latent representation of a yellow image. The raster output scanner 27B is similar to the raster output scanner 27A and thus also includes a new motor polygon assembly 120. A more detailed description of that motor polygon assembly is given subsequently.

The now re-exposed image area then advances to a yellow development station 46 that deposits yellow toner 48 onto the image area. After passing the yellow development station the image area advances to a recharging station 50 where a DC scorotron 52 and an AC scorotron 54 split recharge the image area.

An exposure station 24C then exposes the recharged image area. A modulated laser beam 26C from a raster output scanner 27C then exposes the image area to produce an electrostatic latent representation of a magenta image. The raster output scanner 27C also includes a new motor polygon assembly 120. Again, a more detailed description of that motor polygon assembly is given subsequently. After passing the magenta exposure station the now re-exposed image area advances to a magenta development station 56 that deposits magenta toner 58 onto the image area. After passing the magenta development station the image area advances another recharging station 60 where a DC corotron 62 and an AC scorotron 64 split recharge the image area.

The recharged image area with its toner layers then advances to an exposure station 24D. There, a laser beam 26D from a raster output scanner 27D exposes the image area to produce an electrostatic latent representation of a cyan image. The raster output scanner 27D also includes a new motor polygon assembly 120. Again, a more detailed description of that motor polygon assembly is given subsequently. After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare the composite toner layer for transfer a pre-transfer erase lamp 72 discharges the image area to produce a relatively low charge level on the image area. The image area then passes a pretransfer DC scorotron 80 that performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate. As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor.

The substrate is then directed into a fuser 90 where a heated fuser roller 114, a fuser belt 112, and a pressure roller 122 create a nip through which the substrate 82 passes. The fuser belt is also entrained around a roller 116. The combination of pressure and heat at the nip causes the composite color toner image to fuse into the substrate. After fusing, a chute, not shown, guides the substrate to a catch tray, also not shown, for removal by an operator. As the principles of the present invention operation are closely related to the fuser 90, that fuser and its fuser belt are described in more detail below.

After the substrate 82 separates from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

In addition to the elements described above, the printer 8 also includes a system controller 101 (shown in four places in FIG. 1) that controls the overall operation of the printer and that applies video information to the exposure stations.

Referring now to FIG. 2, the principles of the present invention are closely associated with the motor polygon assembly 120. As previously mentioned, a motor polygon assembly is a part of each of the raster output scanners illustrated in FIG. 1. As shown, the motor polygon assembly includes a housing 124, and a rotating sleeve 126 on which a rotating polygon 128 having reflective facets 130 is mounted. Over the motor polygon assembly is a cover 132 that mounts to a raster output assembly frame 180 using screws 133. As the polygon 128 rotates, modulated light from a laser diode (which is not shown) passes through a window 135, reflects from the facets 130, and passes back through the window and into the post-polygon optical system (which is not shown).

Rotation of the rotating sleeve 126 is induced by using the rotating sleeve as the rotor of a motor. That motor is formed by electromagnets 146 that mount to the housing 124 and by a multi-poled permanent magnet 152 that mounts to the rotating sleeve. Turning now to FIG. 3, the rotating sleeve fits on a cantilevered stationary shaft 140 having a small indentation 142 at the free end 144. The outer surface of the cantilevered stationary shaft 140 has a groove pattern (not shown for clarity). As the rotary sleeve 126 turns those grooves form an air bearing with the rotary sleeve.

In addition to the foregoing, the cover 132 includes a protrusion 160 that fits into the small indentation 142. The cover and its protrusion act to stabilize the free end 144 of the cantilevered stationary shaft 140. This reduces wobble and jitter. Additionally, the stabilization tends to increase the resonant frequency of the assembly. This can be important since the optical components associated with raster output scanners (the pre-polygon and post-polygon optical systems) tend to have relatively low mechanical resonant frequencies. By moving the resonant frequency of the motor polygon assembly away from the resonant frequency of the optical systems the quality of the scan line tends to improve.

It is to be understood that while the figures and the foregoing description illustrate the present invention, they are exemplary only. Others who are skilled in the applicable arts will recognize numerous modifications and adaptations of the illustrated embodiment that will remain within the principles of the present invention. Therefore, the present invention is to be limited only by the appended claims.

What is claimed:

1. A motor polygon assembly, comprising:

a housing holding a cantilevered stationary shaft and motor coils;

a rotating sleeve over said cantilevered stationary shaft, said rotating sleeve including magnets that act with said motor coils to form a motor wherein said rotating sleeve rotates;

a multifaceted polygon mounted on said rotating sleeve; and a cover over said cantilevered stationary shaft, said cover including a protrusion that contacts a free end of said cantilevered stationary shaft.

2. A motor polygon assembly according to claim 1, wherein a said cover is attached to said housing.

3. A motor polygon assembly according to claim 1, wherein said rotating sleeve and said cantilevered stationary shaft form an air bearing when said rotating sleeve rotates.

4. A raster output scanner for producing a scanning light beam, the raster output scanner including a motor polygon assembly, having:

a housing holding a cantilevered stationary shaft and motor coils;

a rotating sleeve over said cantilevered stationary shaft, said rotating sleeve including magnets that act with said motor coils to form a motor wherein said rotating sleeve rotates;

a multifaceted polygon mounted on said rotating sleeve; and a cover over said cantilevered stationary shaft, said cover including a protrusion that contacts a free end of said cantilevered stationary shaft.

5. A raster output scanner according to claim 4, wherein a said cover is attached to said housing.

6. A raster output scanner according to claim 4, wherein said rotating sleeve and said cantilevered stationary shaft form an air bearing when said rotating sleeve rotates.

* * * * *